(12) United States Patent
Horng et al.

(10) Patent No.: US 10,574,105 B2
(45) Date of Patent: Feb. 25, 2020

(54) INNER-ROTOR TYPE MOTOR AND ROTOR THEREOF

(71) Applicant: Sunonwealth Electric Machine Industry Co., Ltd., Kaohsiung (TW)

(72) Inventors: Alex Horng, Kaohsiung (TW); Chi-Min Wang, Kaohsiung (TW); Ku-Ling Liu, Kaohsiung (TW)

(73) Assignee: SUNONWEALTH ELECTRIC MACHINE INDUSTRY CO., LTD., Kaohsiung (TW)

( * ) Notice: Subject to any disclaimer, the term of this patent is extended or adjusted under 35 U.S.C. 154(b) by 205 days.

(21) Appl. No.: 15/655,949

(22) Filed: Jul. 21, 2017

(65) Prior Publication Data

US 2018/0062468 A1 Mar. 1, 2018

(30) Foreign Application Priority Data

Sep. 1, 2016 (TW) ................................. 105128295

(51) Int. Cl.
*H02K 1/28* (2006.01)
*H02K 1/27* (2006.01)

(52) U.S. Cl.
CPC ............. *H02K 1/28* (2013.01); *H02K 1/2773* (2013.01)

(58) Field of Classification Search
CPC ........... H02K 1/27; H02K 1/28; H02K 1/2773
See application file for complete search history.

(56) References Cited

U.S. PATENT DOCUMENTS

| 4,954,736 | A | * | 9/1990 | Kawamoto | ............ | H02K 1/278 |
| | | | | | | 310/156.21 |
| 5,200,662 | A | * | 4/1993 | Tagami | ................ | H02K 1/2773 |
| | | | | | | 310/114 |
| 7,723,887 | B2 | | 5/2010 | Yang et al. | | |
| 9,281,723 | B2 | | 3/2016 | Watanabe et al. | | |
| 9,362,792 | B2 | * | 6/2016 | Figgins | .................... | H02K 1/28 |
| 2005/0088052 | A1 | * | 4/2005 | Ionel | .................... | H02K 1/2773 |
| | | | | | | 310/156.09 |
| 2012/0181895 | A1 | * | 7/2012 | Pan | ...................... | H02K 1/2773 |
| | | | | | | 310/261.1 |

(Continued)

FOREIGN PATENT DOCUMENTS

CN 202759303 U 2/2013
CN 104393698 A 3/2015

*Primary Examiner* — Naishadh N Desai
(74) *Attorney, Agent, or Firm* — Alan D. Kamrath; Karin L. Williams; Mayer & Williams PC

(57) ABSTRACT

An inner-rotor type motor includes an iron core having a magnetic yoke portion and a plurality of magnetic pole portions. The magnetic yoke portion includes an assembly hole through which a shaft extends. A plurality of magnetic pole portions is arranged around the magnetic yoke portion. The iron core includes a plurality of receiving grooves. Each receiving groove is formed between two adjacent magnetic pole portions. The permanent magnets are received in the receiving grooves. At least one abutting member is coupled with an outer periphery of the shaft and includes a radial extension portion having a guiding surface. The guiding surface abuts against at least one of permanent magnets. The iron core, the permanent magnets, and the at least one abutting member of the rotor are received in a compartment of the stator. The shaft of the rotor is rotatably coupled to the stator.

21 Claims, 11 Drawing Sheets

(56) References Cited

U.S. PATENT DOCUMENTS

| | | | |
|---|---|---|---|
| 2014/0102674 A1* | 4/2014 | Manz | H02K 1/2773 |
| | | | 165/121 |
| 2014/0103768 A1* | 4/2014 | Brahmavar | H02K 21/16 |
| | | | 310/156.08 |
| 2014/0103772 A1* | 4/2014 | Kingrey | H02K 15/03 |
| | | | 310/156.15 |
| 2017/0110918 A1 | 4/2017 | Horng et al. | |

* cited by examiner

INNER-ROTOR TYPE MOTOR AND ROTOR THEREOF

CROSS REFERENCE TO RELATED APPLICATIONS

The application claims the benefit of Taiwan application serial No. 105128295, filed on Sep. 1, 2016, and the entire contents of which are incorporated herein by reference.

BACKGROUND OF THE INVENTION

1. Field of the Invention

The present disclosure generally relates to an inner-rotor type motor and a rotor of the inner-rotor type motor and, more particularly, to a rotor having an iron core and an inner-rotor type motor using the rotor.

2. Description of the Related Art

FIG. 1 shows a rotor 9 of a conventional inner-rotor type motor. The rotor 9 includes a shaft 91, an iron core 92 and a plurality of permanent magnets 93. The iron core 92 includes a tubular connection portion 921 fitted around the shaft 91. The tubular connection portion 921 is connected to a plurality of magnetic pole portions 922. The quantities of the magnetic pole portions 922 and the permanent magnets 93 correspond to the quantity of the magnetic poles of the rotor 9. The iron core 92 includes a plurality of magnet-receiving gaps 923 extending through the iron core 92 in an extending direction of the shaft 91. Each magnet-receiving gap 923 is located radially outward of the tubular connection portion 921 and is located between two adjacent magnetic pole portions 922. By this arrangement, the permanent magnets 93 can be respectively received in the magnet-receiving gaps 923. An example of such a rotor 9 can be seen in China Patent No. CN202759303.

Although each permanent magnet 93 can be firmly fixed in a respective one of the magnet-receiving gaps 923 by configuring each magnet-receiving gap 923 to have a dimension equal to the size of the permanent magnets 93, it is difficult to fit the permanent magnets 93 with such size into the magnet-receiving gaps 923 with such dimension during assembly. Therefore, the rotor 9 is configured such that a dimension of each magnet-receiving gap 923 is larger than a size of the corresponding permanent magnet 93. By this arrangement, the permanent magnets 93 can be snugly received in the magnet-receiving gaps 923, and an outer face of each permanent magnet 93 can be bonded to the iron core 92.

However, an adhesive must be applied to each permanent magnet 93 or the iron core 92 to bond the outer face of each permanent magnet 93 to the iron core 92. Use of the adhesive increases the complexity of the production procedure. Moreover, each permanent magnet 93 must bear a radially outward inertia force during rotation of the rotor 9, leading to deterioration or peeling of the adhesive on each permanent magnet 93 or the iron core 92 after a long term of use, shortening the service life of the rotor 9.

Thus, a need exists for a novel inner-rotor type motor and a rotor of the inner-rotor type motor to solve the problems of complex production procedures and short service life.

SUMMARY

It is an objective of this disclosure to provide an inner-rotor type motor and a rotor of the inner-rotor type motor, in which at least one abutting member is provided to fix a plurality of permanent magnets of the rotor in a plurality of receiving grooves of the iron core.

In an aspect of the disclosure, a rotor for an inner-rotor type motor includes a shaft, an iron core, a plurality of permanent magnets, and at least one abutting member. The iron core includes a magnetic yoke portion and a plurality of magnetic pole portions. The magnetic yoke portion includes an assembly hole in a central portion thereof. The shaft extends through the assembly hole. The plurality of magnetic pole portions is arranged around an outer periphery of the magnetic yoke portion. The iron core includes a plurality of receiving grooves. Each of the plurality of receiving grooves is formed between two adjacent magnetic pole portions. The plurality of permanent magnets is received in the plurality of receiving grooves, respectively. The at least one abutting member is coupled with an outer periphery of the shaft. The at least one abutting member includes a radial extension portion having a guiding surface. The guiding surface faces and abuts against at least one of the plurality of permanent magnets.

In an example, the guiding surface has a radial outer edge and a radial inner edge located between the radial outer edge and the magnetic yoke portion in a radial direction of the shaft. A spacing between the radial outer edge and the outer periphery of the shaft is larger than a spacing between the radial inner edge and the outer periphery of the shaft. Thus, the guiding surface faces and abuts against at least one of the plurality of permanent magnets in the radial direction of the shaft.

In an example, the radial outer edge is located distant to the magnetic yoke portion in an axial direction of the shaft perpendicular to the radial direction. The radial inner edge is located adjacent to the magnetic yoke portion in the axial direction of the shaft. A spacing between the guiding surface and the outer periphery of the shaft gradually decreases from the radial outer edge towards the radial inner edge. When the at least one abutting member approaches the iron core in the axial direction of the shaft, the guiding surface can abut and press against the permanent magnets. Thus, the permanent magnets are pushed outwards in the radial direction of the shaft.

In an example, the guiding surface is a circumferential surface facing and abutting against each of the plurality of permanent magnets. Thus, the at least one abutting member can simultaneously abut against each of the plurality of permanent magnets at the same time by only one guiding surface.

In an example, the guiding surface is an arc in a cross section of the at least one abutting member in the radial direction of the shaft. Thus, the contact area between the guiding surface and each permanent magnet is reduced, such that the pressure applied to each permanent magnet by the guiding surface can be increased when the guiding surface abuts and presses against each permanent magnet.

In an example, the at least one of the plurality of permanent magnets includes an inner face facing the magnetic yoke portion and a force-bearing surface connected to an end of the inner face in the axial direction of the shaft. The force-bearing surface is an arc in a cross section of the at least one of the plurality of permanent magnets in the radial direction of the shaft. The guiding surface of the abutting member abuts against the force-bearing surface. The guiding surface and the force-bearing surface in the form of arcs ensure that the guiding surface applies a sufficient pressure to each permanent magnet.

In an example, the guiding surface protrudes towards the at least one of plurality of permanent magnets, and the force-bearing surface protrudes towards the at least one abutting member. Thus, the contact area between the guiding surface and the at least one of the plurality of permanent magnets is further reduced.

In an example, the at least one abutting member includes an extension tube at a central portion of the radial extension portion. The extension tube extends from a side of the magnetic yoke portion into the assembly hole. Thus, the at least one abutting member can be coupled with the shaft via the extension tube. The extension tube abuts against the shaft and the magnetic yoke portion, allowing the iron core to be fixed to the outer periphery of the shaft.

In an example, the assembly hole has non-circular cross sections perpendicular to the axial direction of the shaft. The extension tube of the at least one abutting member has a shape corresponding to a shape of the assembly hole. The at least one abutting member is engaged in the assembly hole. Thus, the at least one abutting member can be engaged in the assembly hole, and the at least one abutting member cannot pivot with respect to the assembly hole, preventing the at least one abutting member from pivoting with respect to the iron core.

In an example, the at least one abutting member includes a shaft hole having non-circular cross sections perpendicular to the axial direction of the shaft. A portion of the shaft received in the shaft hole has a shape corresponding to a shape of the shaft hole. The shaft is engaged in the shaft hole. Thus, the shaft can be engaged in the shaft hole, preventing the shaft from pivoting with respect to at least one abutting member.

In an example, the at least one abutting member includes at least one retaining portion on the guiding surface. The at least one retaining portion extends into at least one of the receiving grooves of the iron core in an axial direction of the shaft. Thus, the at least one abutting member is prevented from pivoting with respect to the iron core by the at least one retaining portion.

In an example, each of the plurality of permanent magnets includes an inner face facing the magnetic yoke portion. The at least one retaining portion abuts against the inner surface of at least one of the plurality of permanent magnets to further enhance the fixing effect of the at least one of the plurality of permanent magnets.

In an example, each of the plurality of magnetic pole portions includes two protrusions located radially distant to the shaft. The two protrusions extend into two of the plurality of receiving grooves respectively on two sides of a corresponding one of the plurality of magnetic pole portions. Thus, each receiving groove can be formed between two adjacent magnetic pole portions, two opposing protrusions respectively of the two adjacent magnetic pole portions, and the magnetic yoke portion. The two opposing protrusions partially cover the outer face of the corresponding one of the plurality of permanent magnets received in the corresponding receiving groove.

In an example, the outer periphery of the magnetic yoke portion is spaced from a central axis of the iron core by a first radius. Each of the two protrusions of each of the plurality of magnetic pole portions is spaced from the central axis of the iron core by a second radius. A difference between the second radius and the first radius is greater than a maximum width of each of the plurality of permanent magnets in the radial direction of the shaft. Thus, the width of each receiving groove in the radial direction of the shaft is larger than the maximum width of each of the plurality of permanent magnets, ensuring that the permanent magnets can be snugly received in the receiving grooves.

In an example, the radial outer edge of the guiding surface is spaced from a central axis of the at least one abutting member by a third radius. The sum of the third radius and the maximum width is larger than the second radius. Thus, when the at least one abutting member approaches the iron core in the axial direction of the shaft, each permanent magnet can be reliably pushed outwards through a sufficient distance in the radial direction of the shaft, such that each permanent magnet contacts the surfaces of the corresponding protrusions facing the corresponding receiving groove.

In an example, the radial inner edge of the guiding surface is spaced from the central axis of the at least one abutting member by a fourth radius. The sum of the fourth radius and the maximum width is smaller than the second radius. Thus, when the at least one abutting member approaches the iron core in the axial direction of the shaft, the radial inner edge of the guiding surface can be located between the magnetic yoke portion and the permanent magnet, ensuring that the permanent magnet can be pushed outwards in the radial direction of the shaft.

In an example, each of the plurality of receiving grooves has a height in the axial direction of the shaft. The height is smaller than a maximum height of each of the plurality of permanent magnets in the axial direction. Thus, each permanent magnet protrudes beyond the corresponding receiving groove in the axial direction of the shaft. Therefore, when the at least one abutting member approaches the iron core in the axial direction of the shaft, the guiding surface can face and abut against at least one of the plurality of permanent magnets.

In an example, a fixing member is mounted around the outer periphery of the shaft by tight coupling. The fixing member abuts against a side of the radial extension portion of the at least one abutting member distant to the magnetic yoke portion. Thus, the fixing member can forcibly secure the at least one abutting member to a side of the iron core, preventing the shaft from pivoting with respect to the at least one abutting member, and ensuring that the guiding surface applies a sufficient pressure to the permanent magnets.

In an example, the at least one abutting member includes two abutting members respectively disposed on two sides of the magnetic yoke portion. Thus, the two abutting members push each of the plurality of permanent magnet outwards in the radial direction of the shaft from the two sides of the magnetic yoke portion, such that the permanent magnet are uniformly pressed.

In an example, each of the two abutting members includes an extension tube at a central portion of the radial extension portion thereof. The extension tubes of the two abutting members respectively extend from the two sides of the magnetic yoke portion into the assembly hole. The extension tubes of the two abutting members respectively have a first coupling portion and a second coupling portion. The two abutting members are coupled with each other by the first and second coupling portions. Thus, the two abutting members can be fixed to each other, enhancing the structural strength of the entire rotor.

In another aspect, an inner-rotor type motor includes the above mentioned rotor and a stator extending annularly to form a compartment. The iron core, the plurality of permanent magnets, and the at least one abutting member of the rotor are received in the compartment. The shaft of the rotor is rotatably coupled to the stator.

Based on the above structures, through the arrangement of the rotor with the at least one abutting member, the guiding surface of the at least one abutting member abuts against the plurality of permanent magnets to push each of the plurality of permanent magnets outwards in the radial direction of the shaft. Each of the plurality of permanent magnets can be fixed in the respective one of the receiving grooves. Thus, the inner-rotor type motor and the rotor of the motor of the disclosure can simplify the production procedure and prolong the service life of the rotor.

The present disclosure will become more fully understood from the detailed description given hereinafter and the accompanying drawings which are given by way of illustration only, and thus are not limitative of the present disclosure.

DETAILED DESCRIPTION

Figure 1:
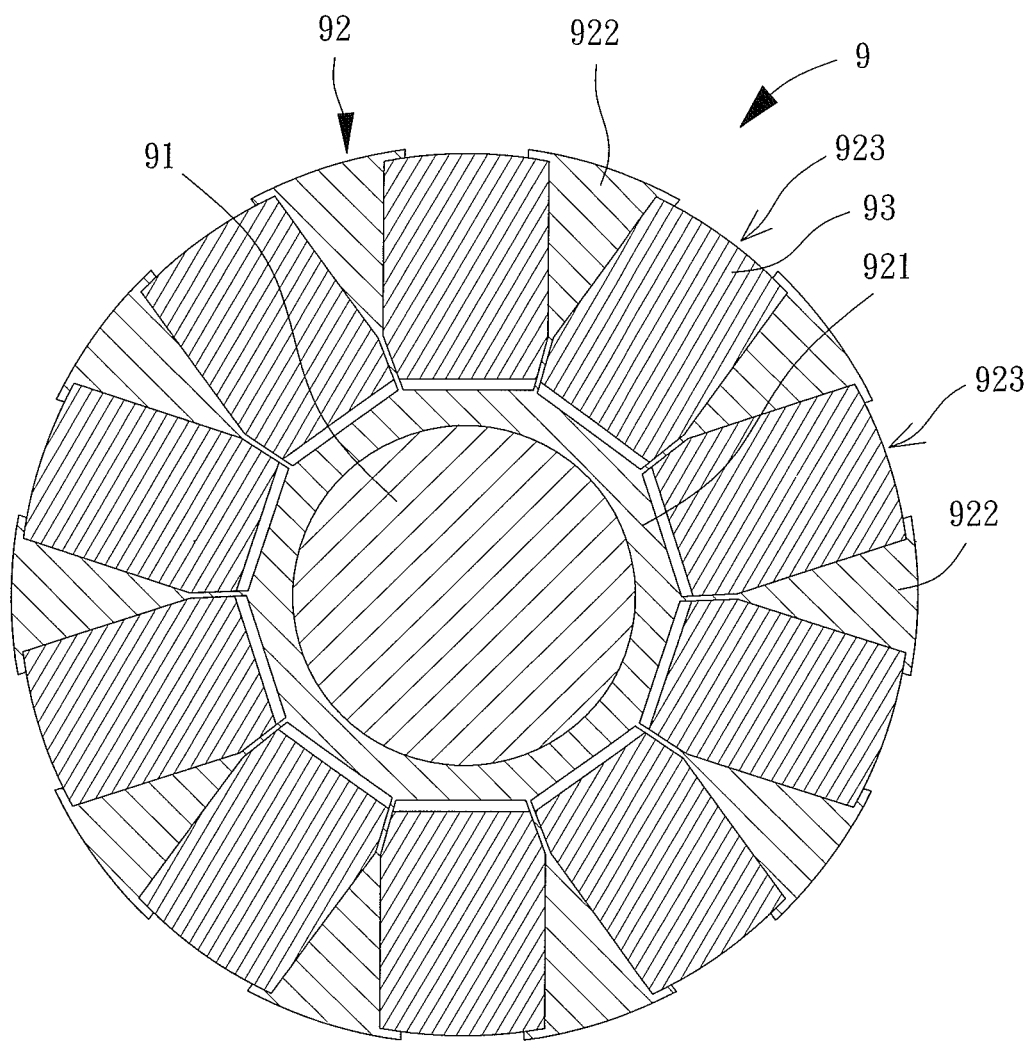
FIG. 1 is a cross sectional view of a rotor of a conventional inner-rotor type motor.
Figure 2:
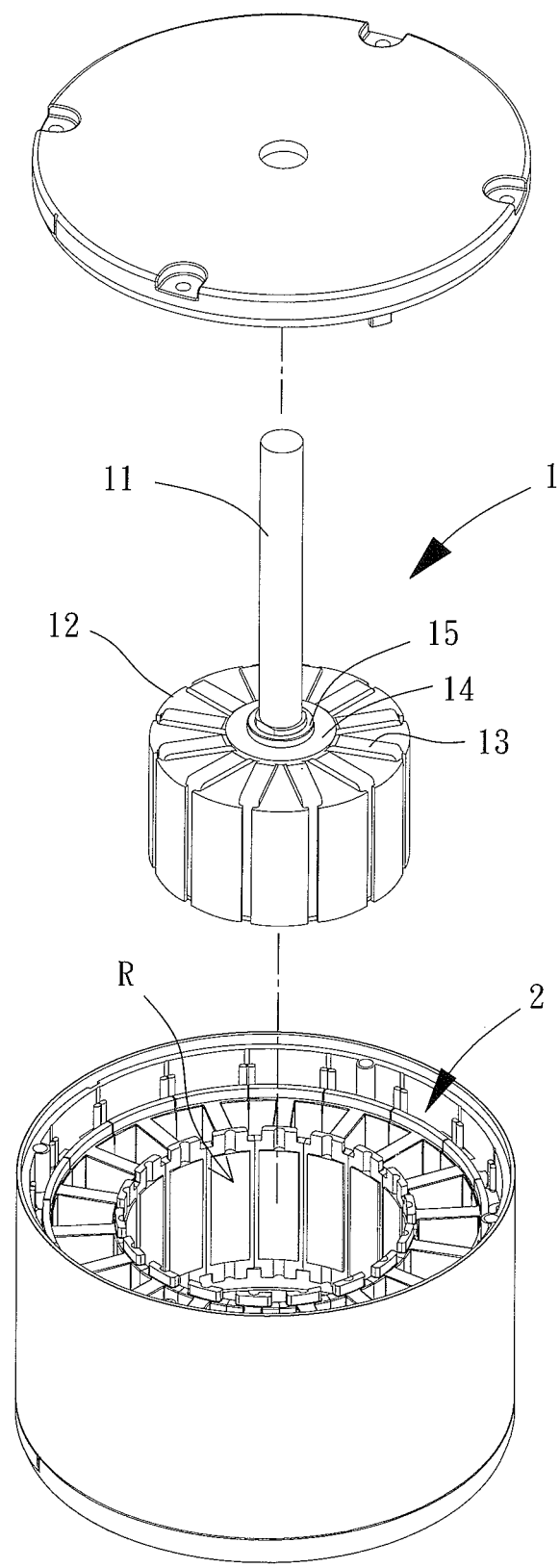
FIG. 2 is an exploded, perspective view of an inner-rotor type motor according to a first embodiment of the disclosure.

FIG. 2 shows an inner-rotor type motor according to a first embodiment of the disclosure. The inner-rotor type motor includes a rotor 1 and a stator 2. The rotor 1 is rotatably coupled to the stator 2.

Figure 3:
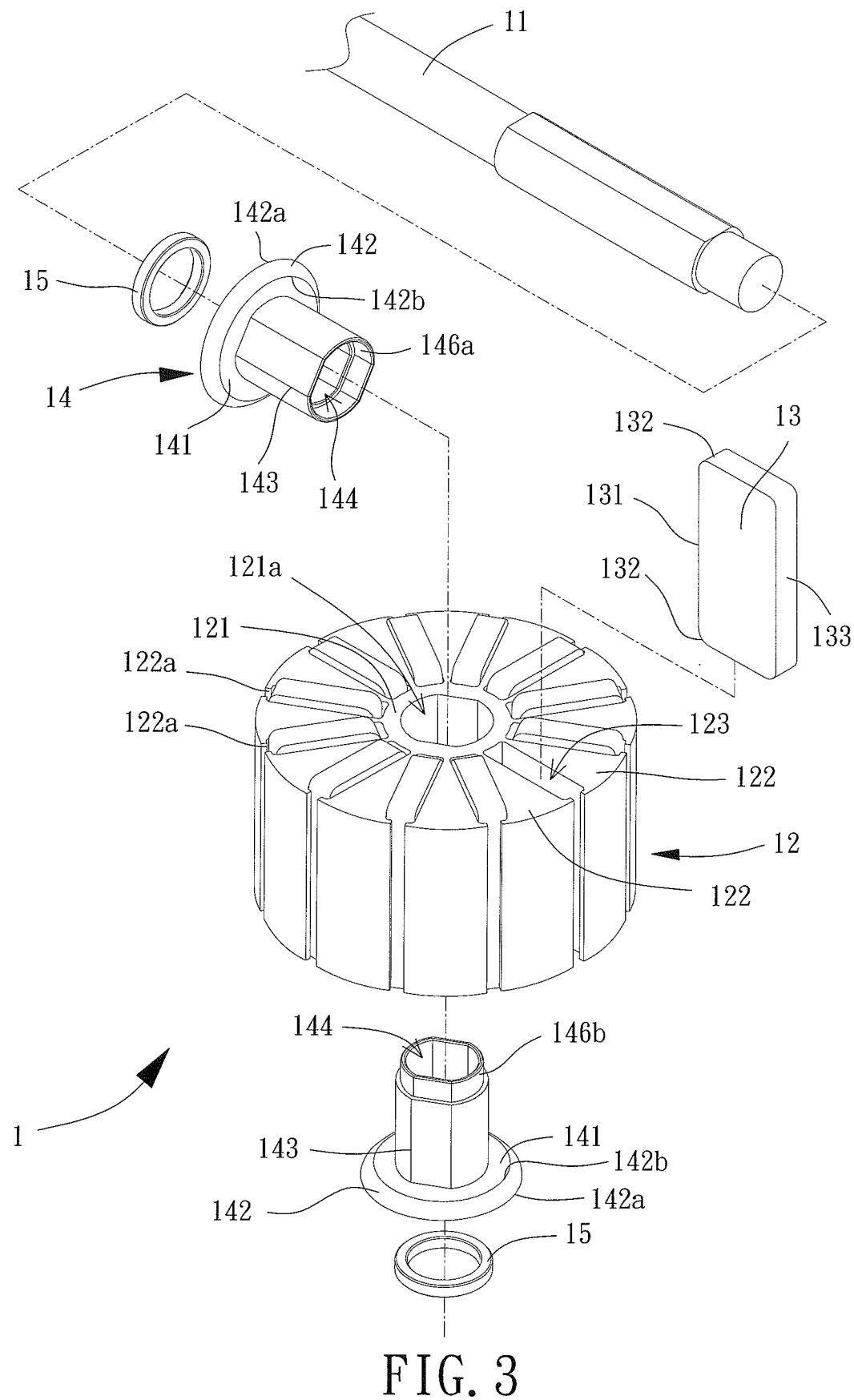
FIG. 3 is an exploded, perspective view of a rotor of the inner-rotor type motor according to the first embodiment of the disclosure.
Figure 4:
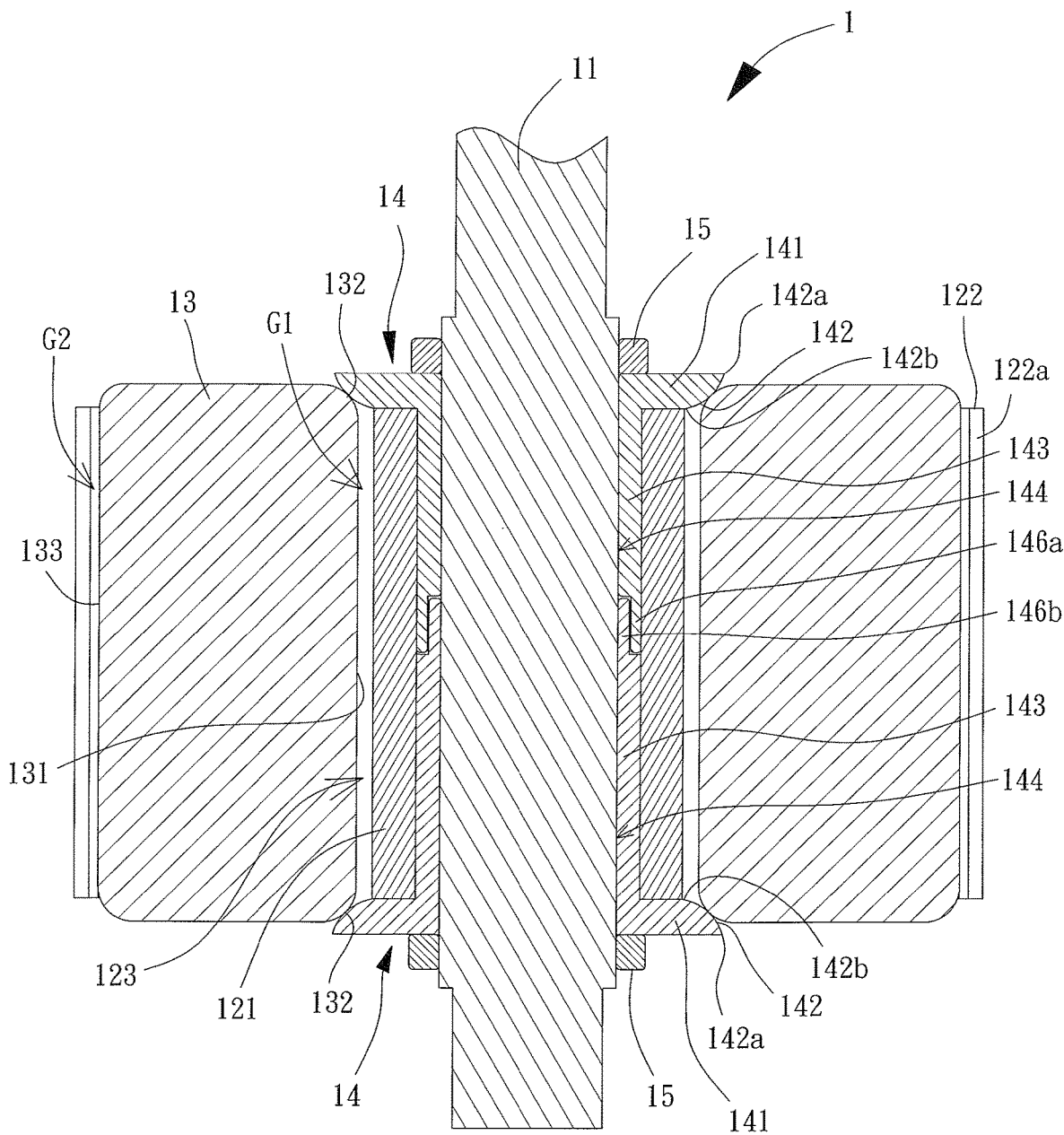
FIG. 4 is a cross sectional view of the rotor of the inner-rotor type motor according to the first embodiment of the disclosure.

FIG. 3 is an exploded, perspective view of the rotor 1. FIG. 4 is a cross sectional view of the rotor 1. The rotor 1 includes a shaft 11, an iron core 12, a plurality of permanent magnets 13 and at least one abutting member 14. The iron core 12 and the at least one abutting member 14 are mounted around an outer periphery of the shaft 11. The permanent magnets 13 are mounted to the iron core 12. The stator 2 (see FIG. 2) extends annularly to form a compartment R. The iron core 12 and the permanent magnets 13 of the rotor 1 are received in the compartment R. The shaft 11 is rotatably coupled to the stator 2.

The iron core 12 is made of magnetically conductive material. For example, the iron core 12 can be comprised of a plurality of stacked silicon steel plates, or can be in the form of a monolithic piece made of magnetically conductive material. The iron core 12 includes a magnetic yoke portion 121 and a plurality of magnetic pole portions 122. The magnetic yoke portion 121 includes an assembly hole 121a in a central portion thereof. The shaft 11 extends through the assembly hole 121a, such that the iron core 12 can be coupled with the outer periphery of the shaft 11. The magnetic pole portions 122 are arranged around an outer periphery of the magnetic yoke portion 121. A receiving groove 123 is formed between two adjacent magnetic pole portions 122. The receiving groove 123 is located outwardly of the magnetic yoke portion 121 in a radial direction perpendicular to a longitudinal axis (an axial direction) of the shaft 11. The quantity of the receiving grooves 123 can correspond to that of the magnetic pole portions 122. Each receiving groove 123 can extend from an end face of the iron core 12 through the other end face of the iron core 12 along the longitudinal axis (namely, the extending direction) of the shaft 11.

The permanent magnets 13 are received in the receiving grooves 123 of the iron core 12. Each receiving groove 123 can receive a permanent magnet 13. Thus, the quantity of the permanent magnets 13 can also correspond to that of the magnetic pole portions 122, such that each permanent magnet 13 is received in a respective one of the receiving grooves 123.

The at least one abutting member 14 is coupled with the outer periphery of the shaft 11. The at least one abutting member 14 is disposed on a side of the iron core 12 in the axial direction of the shaft 11. The at least one abutting member 14 has a radial extension portion 141 with a guiding surface 142. The guiding surface 142 is not parallel to the radial direction of the shaft 11, and the guiding surface 142 faces and abuts against at least one of the permanent magnets 13. The guiding surface 142 has a radial outer edge 142a and a radial inner edge 142b located between the radial outer edge 142a and the magnetic yoke portion 121 in the radial direction of the shaft 11. A spacing between the radial outer edge 142a and the outer periphery of the shaft 11 is larger than a spacing between the radial inner edge 142b and the outer periphery of the shaft 11. Thus, the guiding surface 142 faces and abuts against at least one of the permanent magnets 13 in the radial direction of the shaft 11.

Furthermore, the radial outer edge 142a is located away from the magnetic yoke portion 121 in the axial direction of the shaft 11, and the radial inner edge 142b is located adjacent to the magnetic yoke portion 121 in the axial direction of the shaft 11. The spacing between the guiding surface 142 and the outer periphery of the shaft 11 is gradually reduced from the radial outer edge 142a towards the radial inner edge 142b. By this arrangement, when the at least one abutting member 14 approaches the iron core 12 in the axial direction of the shaft 11, the guiding surface 142 abuts and presses against one or more permanent magnets 13. Thus, the permanent magnets 13 are pushed outwards in the radial direction of the shaft 11.

In this embodiment, the guiding surface 142 can be a circumferential surface, such that the guiding surface 142 faces and abuts against each permanent magnet 13 at the same time. Alternatively, in another embodiment of the disclosure, the at least one abutting member 14 provides a plurality of guiding surfaces 142, such that each guide surface 142 faces and abuts against only one or several of the permanent magnets 13.

Based on the above structure, during assembly of the rotor 1 of the inner-rotor type motor according to the first embodiment of the disclosure, each permanent magnet 13 can be received in a respective one of the receiving grooves 123. The at least one abutting member 14 is then disposed on a side of the iron core 12, such that the guiding surface 142 of the at least one abutting member 14 abuts against the permanent magnets 13 to push each permanent magnet 13 outwards in the radial direction of the shaft 11. By this arrangement, each permanent magnet 13 abuts against two adjacent magnetic pole portions 122 on two sides of the respective one of the receiving groove 123, such that each permanent magnet 13 can be fixed in the respective one of the receiving grooves 123.

As compared with the rotor 9 of the conventional inner-rotor type motor using an adhesive to bond the outer face of each permanent magnet 93 to the iron core 92, the rotor 1 of the inner-rotor type motor according to the first embodiment of the disclosure can push each permanent magnet 13 outwards in the radial direction of the shaft 11 by the at least one abutting member 14. Thus, each permanent magnet 13 can be fixed in the respective one of the receiving grooves 123 without applying any adhesives between the permanent magnets 13 and the iron core 12. Thus, the production procedure of the rotor 1 of the inner-rotor type motor is simplified, and the service life of the rotor 1 can be prolonged.

Based on the above structure, various features of the inner rotor type motor according to embodiments of the disclosure are elaborated below.

Referring to FIGS. 3 and 4, in a cross section of the at least one abutting member 14 in the radial direction of the shaft 11, the guiding surface 142 is in the form of an arc to reduce a contact area between the guiding surface 142 and each permanent magnet 13. As a result, the pressure applied to each permanent magnet 13 by the guiding surface 142 can be increased when the guiding surface 142 abuts and presses against the permanent magnets 13, such that the permanent magnets 13 can be effectively pushed outwards in the radial direction of the shaft 11. Each permanent magnet 13 includes an inner face 131 facing the magnetic yoke portion 121. Each permanent magnet 13 further includes a force-bearing surface 132 connected to a side of the inner face 131 in the axial direction of the shaft 11. In a cross section of each permanent magnet 13 in the radial direction of the shaft 11, the force-bearing surface 132 is also in the form of an arc. The guiding surface 142 of the at least one abutting member 14 abuts against the force-bearing surface 132. Thus, since the guiding surface 142 and the force-bearing surface 132 are both in the form of arcs, it is ensured that the guiding surface 142 can apply a sufficient pressure to the permanent magnet 13. In the first embodiment, the guiding surface 142 protrudes towards the permanent magnet 13, and the force-bearing surface 132 protrudes towards the at least one abutting member 14 to further reduce the contact area between the guiding surface 142 and the permanent magnet 13.

Figure 5:
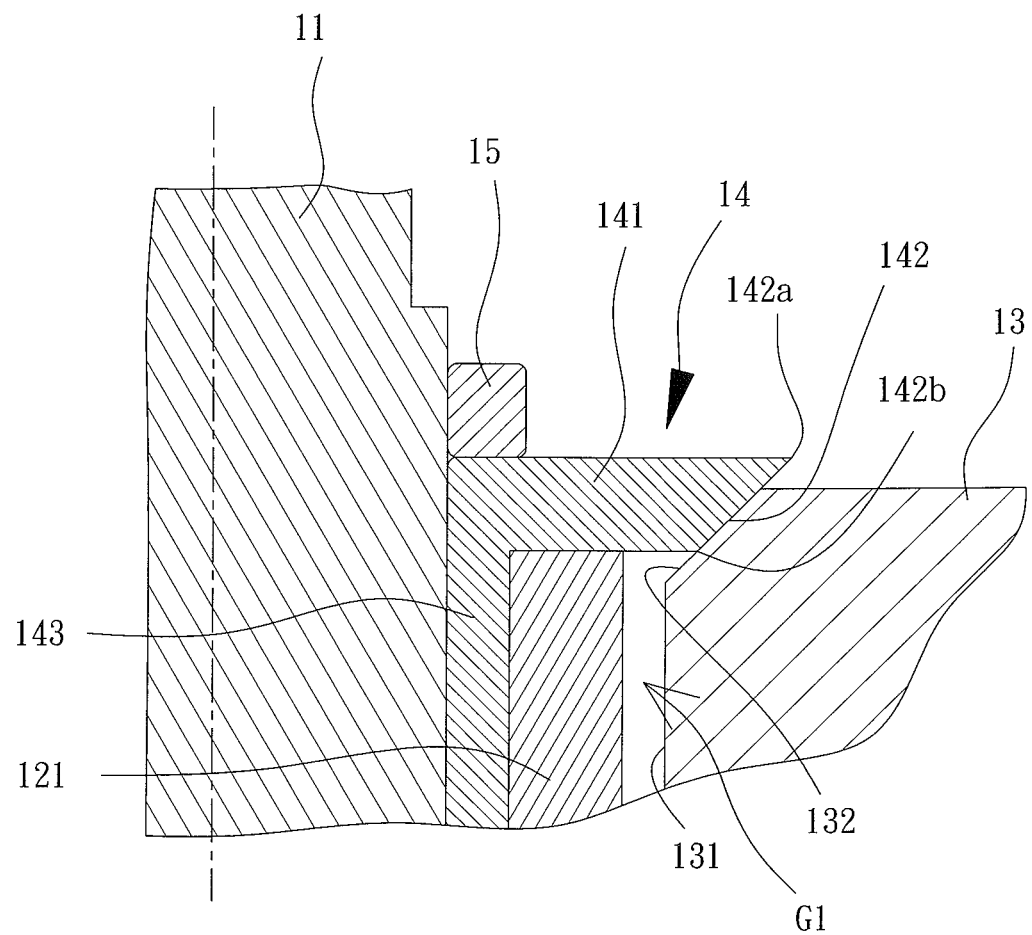
FIG. 5 is a partially enlarged, cross sectional view of a guiding surface and a force-bearing surface of a rotor of an inner-rotor type motor according to an embodiment of the disclosure, with each of the guiding surface and the force-bearing surface being an inclined surface.

In another embodiment of the disclosure, at least one of the guiding surface 142 and the force-bearing surface 132 is in the form of an inclined surface. For example, the spacing between the guiding surface 142 and the outer periphery of the shaft 11 can be reduced gradually, such that the guiding surface 142 is in the form of an inclined surface. The force-bearing surface 132 is in the form of an arc. Alternatively, the force-bearing surface 132 can be in the form of an inclined surface, and the guiding surface 142 is in the form of an arc. As a result, a line contact can be provided between the guiding surface 142 and the force-bearing surface 132. Alternatively, as shown in FIG. 5, the guiding surface 142 and the force-bearing surface 132 can be in the form of an inclined surface, forming a surface contact between the guiding surface 142 and the force-bearing surface 132.

Referring to FIGS. 3 and 4, the at least one abutting member 14 includes an extension tube 143 at a central portion of the radial extension portion 141. The extension tube 143 extends from a side of the magnetic yoke portion 121 into the assembly hole 121a. Thus, the at least one abutting member 14 can be coupled with the shaft 11 via the extension tube 143. The extension tube 143 abuts against the shaft 11 and the magnetic yoke portion 121, allowing the iron core 12 to be fixed to the outer periphery of the shaft 11. Besides, the assembly hole 121a has non-circular cross sections perpendicular to the shaft 11, and the extension tube 143 of the at least one abutting member 14 has a shape corresponding to the shape of the assembly hole 121a. Therefore, the at least one abutting member 14 can be engaged in the assembly hole 121a but cannot pivot with respect to the assembly hole 121a, preventing the at least one abutting member 14 from pivoting with respect to the iron core 12.

Furthermore, the at least one abutting member 14 has a shaft hole 144 extending through the abutting member 14 in the axial direction of the shaft 11. The shaft hole 144 has non-circular cross sections perpendicular to the shaft 11, and a portion of the shaft 11 received in the shaft hole 144 has a shape corresponding to the shape of the shaft hole 144. Therefore, the shaft 11 can be engaged in the shaft hole 144, preventing the shaft 11 from pivoting with respect to the abutting member 14.

Furthermore, each magnetic pole portion 122 includes two protrusions 122a which are located radially distant to the shaft 11. The two protrusions 122a respectively extend into two of the receiving grooves 123 respectively on two sides of the magnetic pole portion 122. Thus, the receiving groove 123 can be formed between the magnetic yoke portion 121, two adjacent magnetic pole portions 122, and two opposing protrusions 122a respectively of the two adjacent magnetic pole portions 122. Each permanent magnet 13 includes an outer face 133 away from the magnetic yoke portion 121. The two opposing protrusions 122a partially cover the outer face 133 of the permanent magnet 13 received in the corresponding receiving groove 123.

Figure 6A:
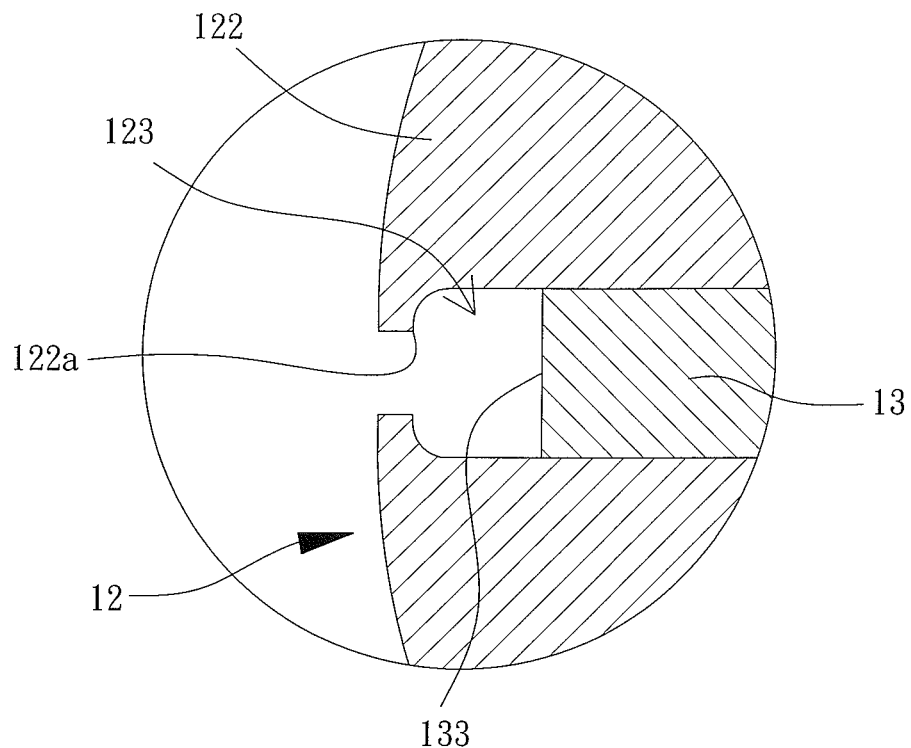
FIG. 6a is a partially enlarged, cross sectional view of two protrusions of the rotor of the inner-rotor type motor according to the first embodiment of the disclosure.
Figure 6B:
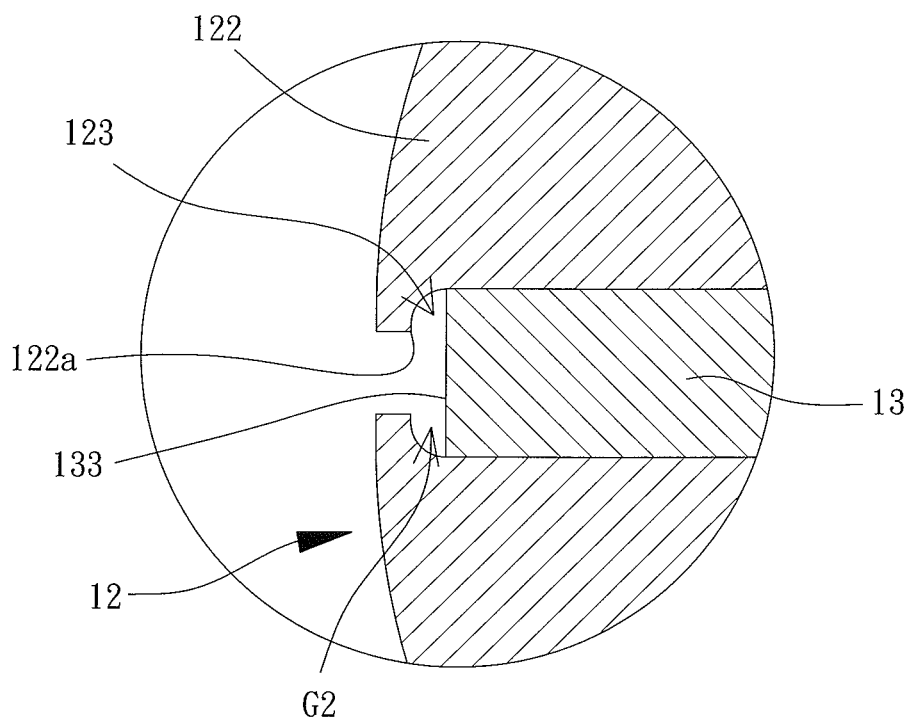
FIG. 6b is a partially enlarged, cross sectional view of the protrusions of the rotor of the inner-rotor type motor according to the first embodiment of the disclosure after a permanent magnet is pushed.

Referring to FIGS. 3 and 6a, a surface of each protrusion 122a facing the receiving groove 123 can be in the form of a curved face (such as a concave surface) or an inclined surface. Accordingly, as shown in FIG. 6b, after each permanent magnet 13 has been pushed outwards in the radial direction of the shaft 11, a line contact can be formed between the outer face 133 of the permanent magnet 13 and each of the two opposing protrusions 122a on the outer side of the corresponding receiving groove 123, reducing the contact area between the guiding surface 142 and the permanent magnet 13. As a result, the pressure applied to each permanent magnet 13 by the corresponding protrusions 122a can be increased when the guiding surface 142 abuts and presses against the permanent magnet 13. Moreover, referring to FIGS. 3, 4 and 6b, since each permanent magnet 13 is pushed outwards in the radial direction of the shaft 11, a gap G1 can be formed between the inner face 131 of each permanent magnet 13 and the magnetic yoke portion 121. Besides, since the surface of each protrusion 122a facing the receiving groove 123 can be in the form of a curved face, another gap G2 can be formed between a periphery of each of the two opposing protrusions 122a and the outer face 133 of the corresponding permanent magnet 13. Namely, the inner face 131 of each permanent magnet 13 is spaced from the iron core 12 by the gap G1, and the outer face 133 of each permanent magnet 13 is also spaced from the iron core 12 by the gap G2, thereby achieving the required heat dissipation.

Figure 7:
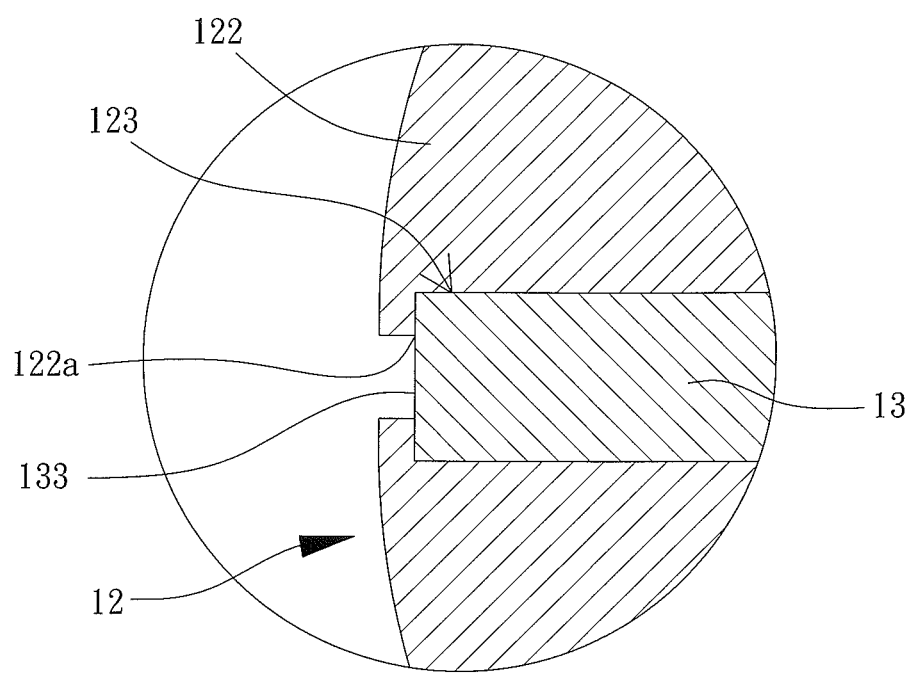
FIG. 7 is a partially enlarged, cross sectional view of two protrusions of a rotor of an inner-rotor type motor according to an embodiment of the disclosure, with the protrusions abutting against an outer face of a permanent magnet.

Referring to FIG. 7, in another embodiment of the disclosure, a surface of each protrusion 122a facing the receiving groove 123 abuts against the outer face 133 of the corresponding permanent magnet 13. Specifically, since the outer face 133 can be a flat surface, the surface of each protrusion 122a facing the receiving groove 123 can be perpendicular to a surface of the magnetic pole portion 122 facing the permanent magnet 13, such that the surface of the protrusion 122a facing the receiving groove 123 abuts against the outer face 133 of the permanent magnet 13, forming a surface contact between the protrusion 122a and the outer face 133.

Figure 8:
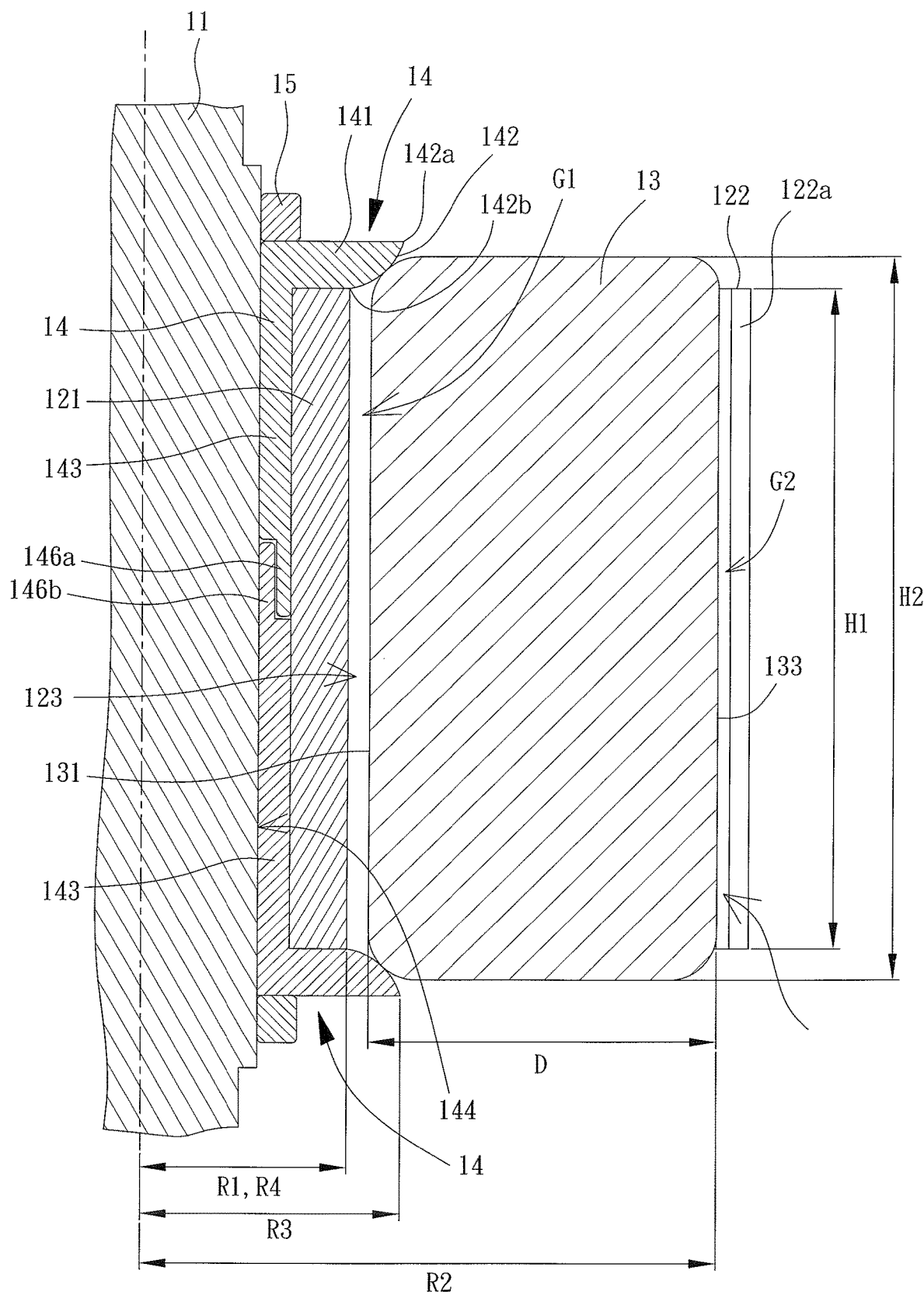
FIG. 8 is a partially enlarged, cross sectional view of the rotor of the inner-rotor type motor according to the first embodiment of the disclosure.

Referring to FIG. 8, the outer periphery of the magnetic yoke portion 121 is spaced from a central axis of the iron core 12 (which is coincident with the longitudinal axis of the shaft 11) by a first radius R1, and each protrusion 122a of each magnetic pole portion 122 is spaced from the central axis of the iron core 12 by a second radius R2. The radius representing a spacing between the protrusion 122a and the central axis of the iron core 12 may not be a constant since the surface of the protrusion 122a facing the receiving groove 123 can be in the form of a curved face. Thus, the second radius R2 can be defined as a minimum radius between the protrusion 122a and the central axis of the iron core 12. The difference between the second radius R2 and the first radius R1 is greater than a maximum width D of each permanent magnet 13 in the radial direction of the shaft 11. By this arrangement, the width of each receiving groove 123 in the radial direction of the shaft 11 is larger than the maximum width D of each permanent magnet 13, ensuring that the permanent magnets 13 can be snugly received in the receiving grooves 123.

In addition, the radial outer edge 142a of the guiding surface 142 is spaced from the central axis of the at least one abutting member 14 by a third radius R3. The sum of the third radius R3 and the maximum width D is greater than the second radius R2. By this arrangement, when the at least one abutting member 14 approaches the iron core 12 in the axial direction of the shaft 11, each permanent magnet 13 can be reliably pushed outwards through a sufficient distance in the radial direction of the shaft 11, such that each permanent magnet 13 contacts the surface of the corresponding protrusions 122a facing the corresponding receiving groove 123. Furthermore, the radial inner edge 142b of the guiding surface 142 is spaced from the central axis of the at least one abutting member 14 by a fourth radius R4. The sum of the fourth radius R4 and the maximum width D is smaller than the second radius R2. By this arrangement, when the at least one abutting member 14 approaches the iron core 12 in the axial direction of the shaft 11, the radial inner edge 142b of the guiding surface 142 can be located between the magnetic yoke portion 121 and the permanent magnets 13, ensuring that the permanent magnets 13 can be pushed outwards in the radial direction of the shaft 11.

Furthermore, the receiving groove 123 of the iron core 12 has a height H1 in the axial direction of the shaft 11. The height H1 is smaller than a maximum height H2 of each permanent magnet 13 in the axial direction of the shaft 11. By this arrangement, each permanent magnet 13 protrudes beyond the corresponding receiving groove 123 in the axial direction of the shaft 11. Therefore, when the at least one abutting member 14 approaches the iron core 12 in the axial direction of the shaft 11, the guiding surface 142 faces and abuts against at least one of the permanent magnets 13. However, in another embodiment of the disclosure, the height H1 of each receiving groove 123 is larger than or equal to the maximum height H2 of each permanent magnet 13, and the guiding surface 142 extends into the receiving grooves 123. By this arrangement, the guiding surface 142 can also abut against at least one of the permanent magnets 13.

Figure 9:
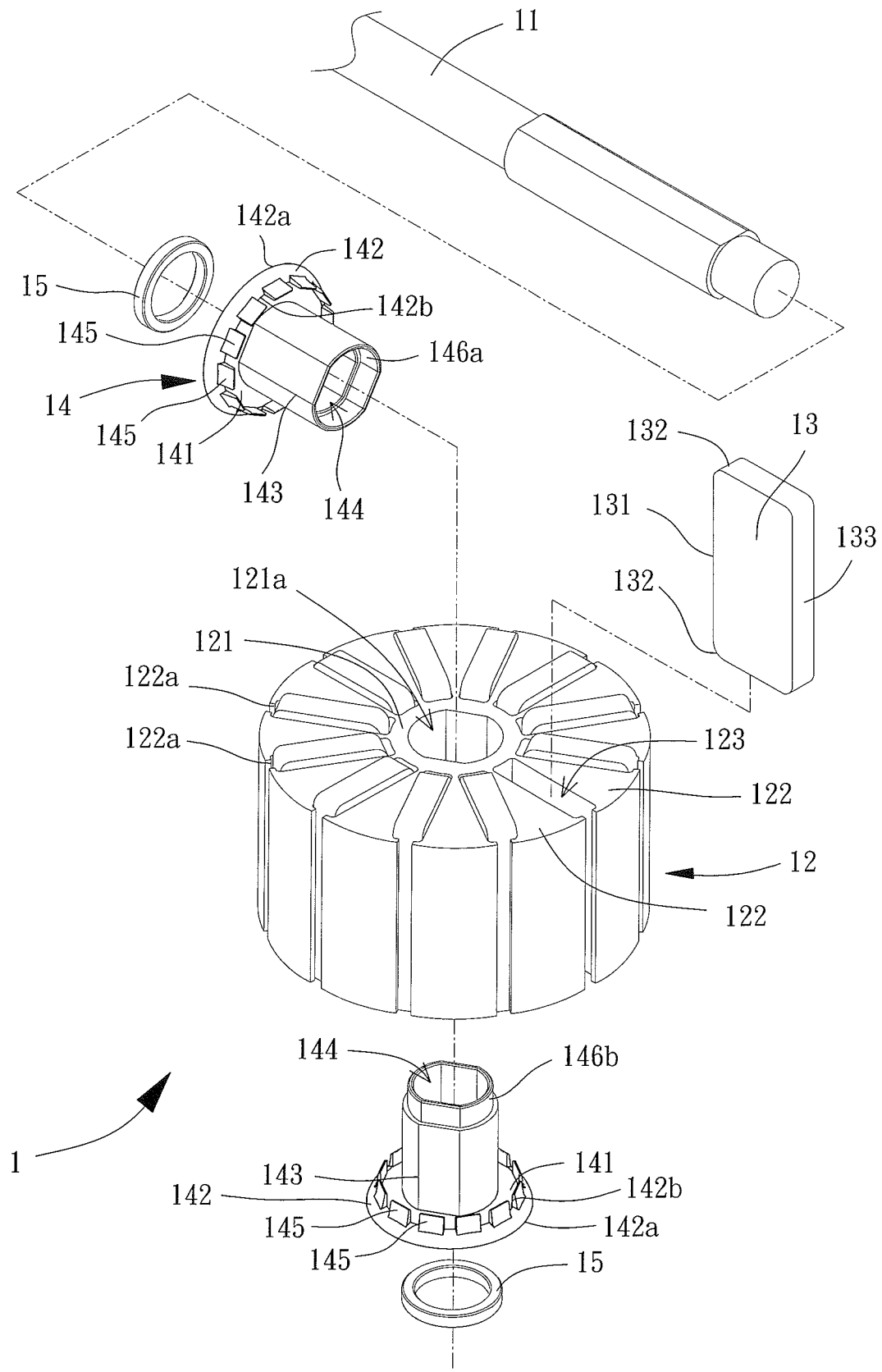
FIG. 9 is an exploded, perspective view of a rotor of the inner-rotor type motor according to a second embodiment of the disclosure.
Figure 10:
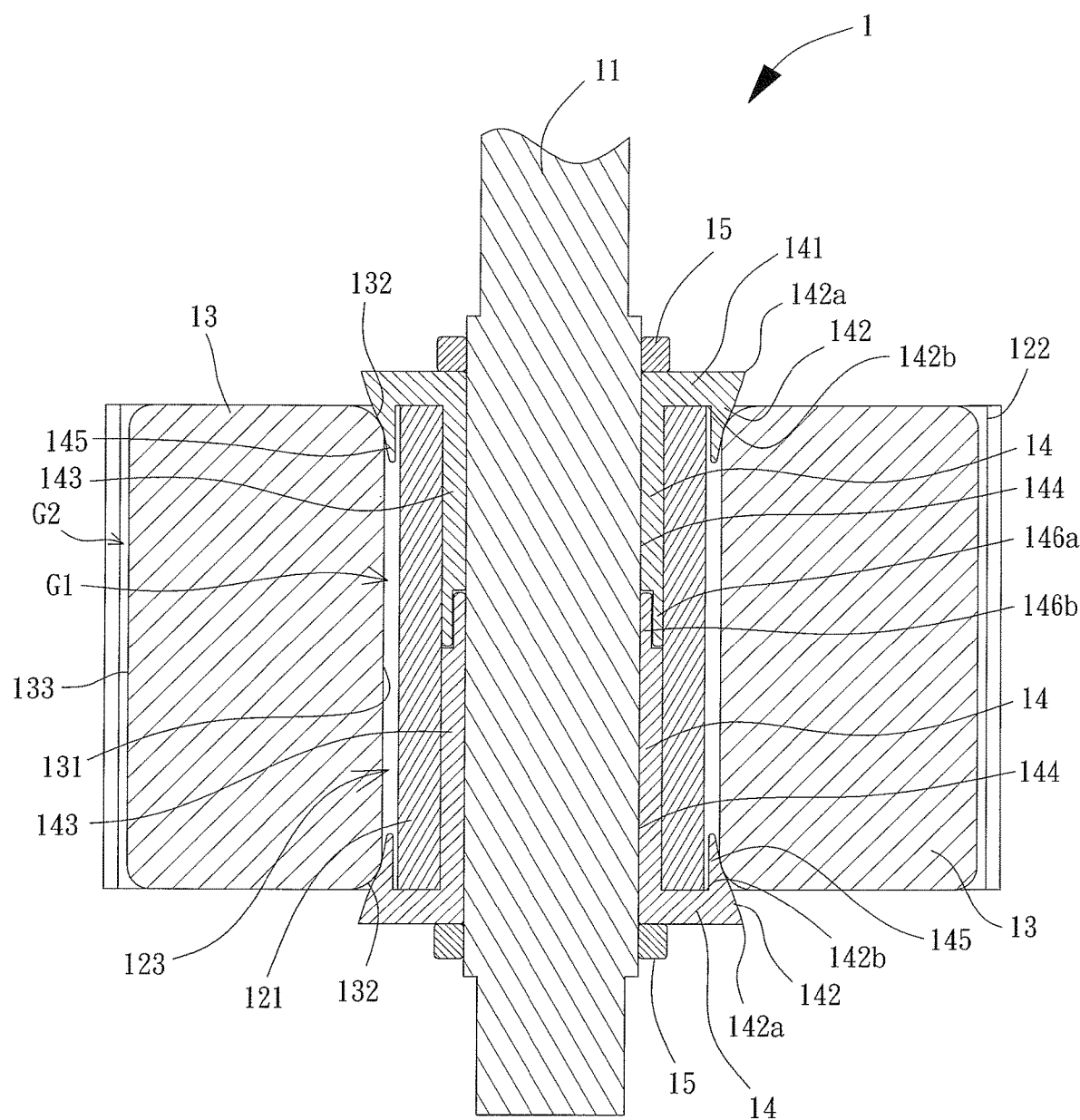
FIG. 10 is a cross sectional view of the rotor of the inner-rotor type motor according to the second embodiment of the disclosure.

FIGS. 9 and 10 show a rotor 1 of an inner-rotor type motor according to a second embodiment of the disclosure. The second embodiment differs from the first embodiment in that the at least one abutting member 14 includes at least one retaining portion 145. The at least one retaining portion 145 extends into at least one one of the receiving grooves 123 in the axial direction of the shaft 11. Thus, pivotal movement of the at least one abutting member 14 with respect to the iron core 12 is prevented by the retaining portion 145. Besides, the retaining portion 145 abuts against the inner face 131 of at least one of the permanent magnets 13, further enhancing the fixing effect on the permanent magnets 13 achieved by the at least one abutting member 14.

Referring to FIG. 2, 3, 4, 5, 8, 9 or 10, in the inner-rotor type motors according to various embodiments of the disclosure, the rotor 1 can further include a fixing member 15. The fixing member 15 can be an annular ring made of metal (such as copper). The fixing member 15 is mounted around the outer periphery of the shaft 11 by tight coupling, and the fixing member 15 abuts against a side of the radial extension portion 141 of the at least one abutting member 14 away from the magnetic yoke portion 121. Thus, the fixing member 15 can forcibly secure the at least one abutting member 14 to a side of the iron core 12, preventing the shaft 11 from pivoting with respect to the abutting member 14, and ensuring that the guiding surface 142 applies a sufficient pressure to each permanent magnet 13.

Moreover, since each receiving groove 123 can extend from an end face of the iron core 12 through the other end face of the iron core 12, the quantity of the at least one abutting member 14 can be two. The two abutting members 14 are respectively arranged at two sides of the magnetic yoke portion 121. By this arrangement, during assembly of the rotor 1, the two abutting members 14 push permanent magnets 13 outwards in the radial direction of the shaft 11 from the two sides of the magnetic yoke portion 121, such that the permanent magnets 13 are uniformly pressed. However, if the receiving groove 123 is formed in only one end face of the iron core 12, only one abutting member 14 is sufficient.

Figure 11:
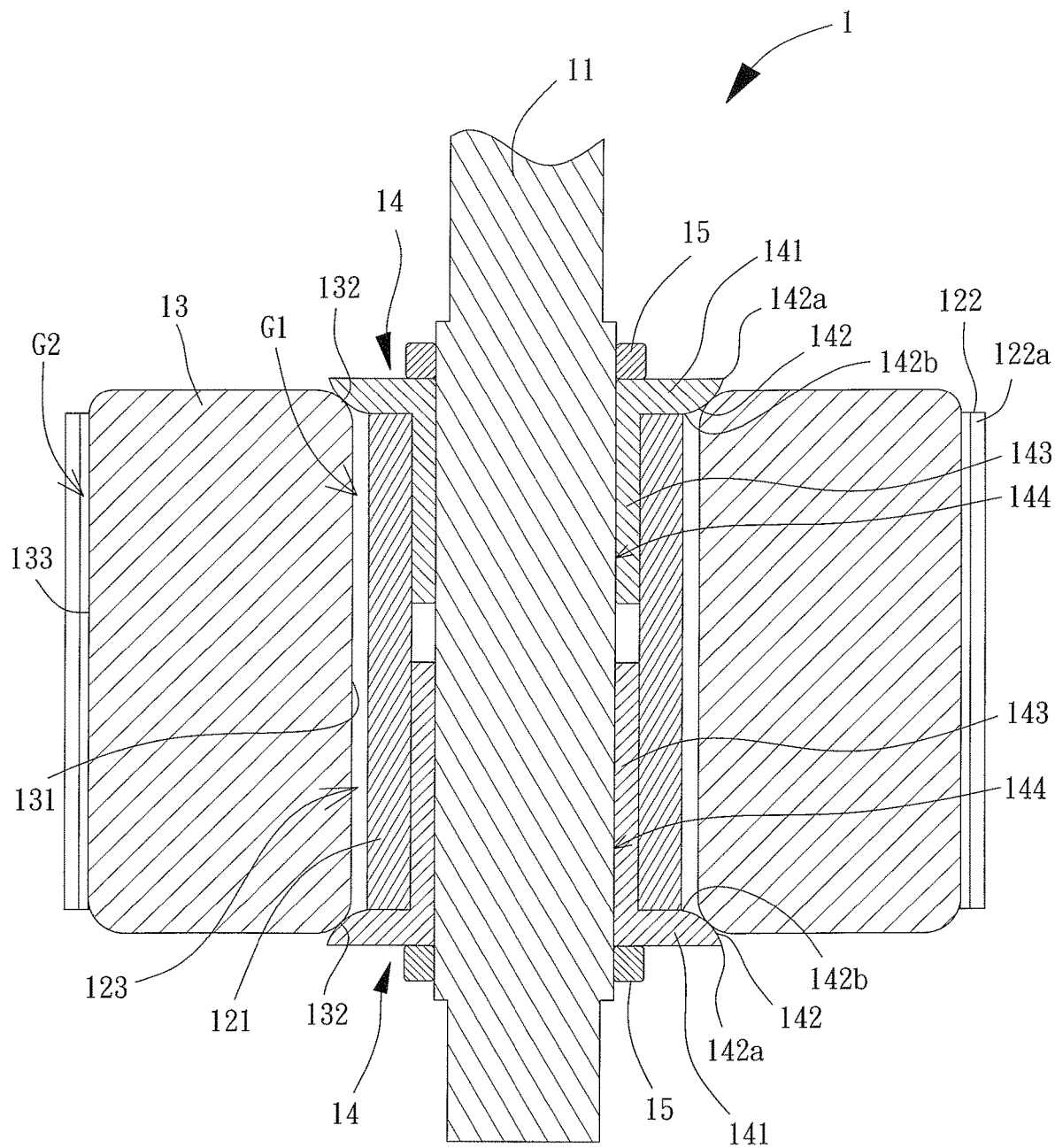
FIG. 11 is a cross sectional view of an inner-rotor type motor with spacedly arranged abutting members according to an embodiment of the disclosure.

Furthermore, in a case that two abutting members 14 are utilized, each abutting member 14 includes an extension tube 143 at a central portion of the radial extension portion 141 thereof. The extension tubes 143 of the two abutting members 14 respectively extend from the two sides of the magnetic yoke portion 121 into the assembly hole 121a. The extension tubes 143 of the two abutting members 14 have a first coupling portion 146a and a second coupling portion 146b, respectively. The two abutting members 14 are coupled with each other via the first coupling portion 146a and the second coupling portion 146b. Thus, the two abutting members 14 can be fixed to each other, enhancing the structural strength of the entire rotor 1. However, in another embodiment shown in FIG. 11, the extension tubes 143 of the two abutting members 14 can be separated from each other by a spacing. Thus, the two abutting members 14 do not have to include correspondingly arranged coupling mechanisms, simplifying the structure of each abutting member 14.

In view of foregoing, through the arrangement of the rotor 1 with the at least one abutting member 14, the guiding surface 142 of the at least one abutting member 14 abuts against the permanent magnets 13 to push each permanent magnet 13 outwards in the radial direction of the shaft 11, such that each permanent magnet 13 can be fixed in one of the receiving grooves 123. In comparison with the rotor 9 of the conventional inner-rotor type motor using an adhesive to bond the outer face of each permanent magnet 93 to the iron core 92, it is unnecessary for the inner-rotor type motors and the rotors 1 of the motors disclosed in various embodiments of the disclosure to apply any adhesives to the permanent magnets 13 or the iron core 12. Therefore, the production procedure of the rotor 1 of the inner-rotor type motor is simplified, and the service life of the rotor 1 can be prolonged.

Although the disclosure has been described in detail with reference to its presently preferable embodiments, it will be understood by one of ordinary skill in the art that various modifications can be made without departing from the spirit and the scope of the disclosure, as set forth in the appended claims.

What is claimed is:

1. A rotor for an inner-rotor type motor, comprising:
   a shaft;
   an iron core including a magnetic yoke portion and a plurality of magnetic pole portions, with the magnetic yoke portion including an assembly hole in a central portion thereof, with the shaft extending through the assembly hole, with the plurality of magnetic pole portions arranged around an outer periphery of the magnetic yoke portion, with the iron core including a plurality of receiving grooves, and with each of the plurality of receiving grooves formed between two adjacent magnetic pole portions;
   a plurality of permanent magnets received in the plurality of receiving grooves, respectively; and
   at least one abutting member coupled with an outer periphery of the shaft, with the at least one abutting member including a radial extension portion having a guiding surface, and with the guiding surface facing and abutting against at least one of the plurality of permanent magnets,
   wherein the guiding surface has a radial outer edge and a radial inner edge located between the radial outer edge and the magnetic yoke portion in a radial direction of the shaft, and
   wherein the radial extension portion of the abutting member has a thickness gradually increasing from the radial outer edge to the radial inner edge.

2. The rotor for an inner-rotor type motor as claimed in claim 1, with a spacing between the radial outer edge and the outer periphery of the shaft being larger than a spacing between the radial inner edge and the outer periphery of the shaft.

3. The rotor for an inner-rotor type motor as claimed in claim 2, with the radial outer edge located distant to the magnetic yoke portion in an axial direction of the shaft perpendicular to the radial direction, with the radial inner edge located adjacent to the magnetic yoke portion in the axial direction of the shaft, and with a spacing between the guiding surface and the outer periphery of the shaft gradually decreasing from the radial outer edge towards the radial inner edge.

4. The rotor for an inner-rotor type motor as claimed in claim 3, wherein the guiding surface is a circumferential surface facing and abutting against each of the plurality of permanent magnets.

5. The rotor for an inner-rotor type motor as claimed in claim 2, wherein the guiding surface is an arc in a cross section of the at least one abutting member in the radial direction of the shaft.

6. The rotor for an inner-rotor type motor as claimed in claim 5, with the at least one of the plurality of permanent magnets including an inner face facing the magnetic yoke portion and a force-bearing surface connected to an end of the inner face in the axial direction of the shaft, with the force-bearing surface being an arc in a cross section of the at least one of the plurality of permanent magnets in the radial direction of the shaft, and with the guiding surface of the abutting member abutting against the force-bearing surface.

7. A rotor for an inner-rotor type motor, comprising:
   a shaft;
   an iron core including a magnetic yoke portion and a plurality of magnetic pole portions, with the magnetic yoke portion including an assembly hole in a central portion thereof, with the shaft extending through the assembly hole, with the plurality of magnetic pole portions arranged around an outer periphery of the magnetic yoke portion, with the iron core including a plurality of receiving grooves, and with each of the plurality of receiving grooves formed between two adjacent magnetic pole portions;
   a plurality of permanent magnets received in the plurality of receiving grooves, respectively; and
   at least one abutting member coupled with an outer periphery of the shaft, with the at least one abutting member including a radial extension portion having a guiding surface, and with the guiding surface facing and abutting against at least one of the plurality of permanent magnets,
   with the guiding surface having a radial outer edge and a radial inner edge located between the radial outer edge and the magnetic yoke portion in a radial direction of the shaft, with a spacing between the radial outer edge and the outer periphery of the shaft being larger than a spacing between the radial inner edge and the outer periphery of the shaft,
   wherein the guiding surface is an arc in a cross section of the at least one abutting member in the radial direction of the shaft,
   with the at least one of the plurality of permanent magnets including an inner face facing the magnetic yoke portion and a force-bearing surface connected to an end of the inner face in the axial direction of the shaft, with the force-bearing surface being an arc in a cross section of the at least one of the plurality of permanent magnets in the radial direction of the shaft, and with the guiding surface of the abutting member abutting against the force-bearing surface,
   wherein the guiding surface protrudes towards the at least one of plurality of permanent magnets, and wherein the force-bearing surface protrudes towards the at least one abutting member.

8. A rotor for an inner-rotor type motor, comprising:
   a shaft;

an iron core including a magnetic yoke portion and a plurality of magnetic pole portions, with the magnetic yoke portion including an assembly hole in a central portion thereof, with the shaft extending through the assembly hole, with the plurality of magnetic pole portions arranged around an outer periphery of the magnetic yoke portion, with the iron core including a plurality of receiving grooves, and with each of the plurality of receiving grooves formed between two adjacent magnetic pole portions;

a plurality of permanent magnets received in the plurality of receiving grooves, respectively; and at least one abutting member coupled with an outer periphery of the shaft, with the at least one abutting member including a radial extension portion having a guiding surface, and with the guiding surface facing and abutting against at least one of the plurality of permanent magnets, with the at least one abutting member including an extension tube at a central portion of the radial extension portion, and with the extension tube extending from a side of the magnetic yoke portion into the assembly hole.

9. The rotor for an inner-rotor type motor as claimed in claim 8, with the assembly hole having non-circular cross sections perpendicular to the axial direction of the shaft, with the extension tube of the at least one abutting member having a shape corresponding to a shape of the assembly hole, and with the at least one abutting member engaged in the assembly hole.

10. The rotor for an inner-rotor type motor as claimed in claim 9, with the at least one abutting member having a shaft hole, with the shaft hole having non-circular cross sections perpendicular to the axial direction of the shaft, wherein a portion of the shaft received in the shaft hole has a shape corresponding to a shape of the shaft hole, and with the shaft engaged in the shaft hole.

11. The rotor for an inner-rotor type motor as claimed in claim 1, with the at least one abutting member including at least one retaining portion on the guiding surface, and with the at least one retaining portion extending into at least one of the receiving grooves of the iron core in an axial direction of the shaft.

12. The rotor for an inner-rotor type motor as claimed in claim 11, with each of the plurality of permanent magnets including an inner face facing the magnetic yoke portion, and with the at least one retaining portion abutting against the inner surface of at least one of the plurality of permanent magnets.

13. The rotor for an inner-rotor type motor as claimed in claim 2, with each of the plurality of magnetic pole portions including two protrusions located radially distant to the shaft, with the two protrusions extending into two of the plurality of receiving grooves respectively on two sides of a corresponding one of the plurality of magnetic pole portions.

14. The rotor for an inner-rotor type motor as claimed in claim 13, with the outer periphery of the magnetic yoke portion spaced from a central axis of the iron core by a first radius, with each of the two protrusions of each of the plurality of magnetic pole portions spaced from the central axis of the iron core by a second radius, and with a difference between the second radius and the first radius being greater than a maximum width of each of the plurality of permanent magnets in the radial direction of the shaft.

15. A rotor for an inner-rotor type motor, comprising:
a shaft;

an iron core including a magnetic yoke portion and a plurality of magnetic pole portions, with the magnetic yoke portion including an assembly hole in a central portion thereof, with the shaft extending through the assembly hole, with the plurality of magnetic pole portions arranged around an outer periphery of the magnetic yoke portion, with the iron core including a plurality of receiving grooves, and with each of the plurality of receiving grooves formed between two adjacent magnetic pole portions;

a plurality of permanent magnets received in the plurality of receiving grooves, respectively; and at least one abutting member coupled with an outer periphery of the shaft, with the at least one abutting member including a radial extension portion having a guiding surface, and with the guiding surface facing and abutting against at least one of the plurality of permanent magnets, with the guiding surface having a radial outer edge and a radial inner edge located between the radial outer edge and the magnetic yoke portion in a radial direction of the shaft, with a spacing between the radial outer edge and the outer periphery of the shaft being larger than a spacing between the radial inner edge and the outer periphery of the shaft, with each of the plurality of magnetic pole portions including two protrusions located radially distant to the shaft, with the two protrusions extending into two of the plurality of receiving grooves respectively on two sides of a corresponding one of the plurality of magnetic pole portions, with the outer periphery of the magnetic yoke portion spaced from a central axis of the iron core by a first radius, with each of the two protrusions of each of the plurality of magnetic pole portions spaced from the central axis of the iron core by a second radius, and with a difference between the second radius and the first radius being greater than a maximum width of each of the plurality of permanent magnets in the radial direction of the shaft, with the radial outer edge of the guiding surface spaced from a central axis of the at least one abutting member by a third radius, and with a sum of the third radius and the maximum width being larger than the second radius.

16. A rotor for an inner-rotor type motor, comprising:
a shaft;
an iron core including a magnetic yoke portion and a plurality of magnetic pole portions, with the magnetic yoke portion including an assembly hole in a central portion thereof, with the shaft extending through the assembly hole, with the plurality of magnetic pole portions arranged around an outer periphery of the magnetic yoke portion, with the iron core including a plurality of receiving grooves, and with each of the plurality of receiving grooves formed between two adjacent magnetic pole portions;

a plurality of permanent magnets received in the plurality of receiving grooves, respectively; and at least one abutting member coupled with an outer periphery of the shaft, with the at least one abutting member including a radial extension portion having a guiding surface, and with the guiding surface facing and abutting against at least one of the plurality of permanent magnets, with the guiding surface having a radial outer edge and a radial inner edge located between the radial outer edge and the magnetic yoke portion in a radial direction of the shaft, with a spacing between the radial outer edge and the outer periphery of the shaft being larger than a spacing between the radial inner edge and the outer periphery of the shaft, with each of the plurality of magnetic pole portions including two protrusions located radially distant to the shaft, with the two protrusions extending into two of the plurality of receiving grooves respectively on two sides of a corresponding one of the plurality of magnetic pole portions, with the outer periphery of the magnetic yoke portion spaced from a central axis of the iron core by a first radius, with each of the two protrusions of each of the plurality of magnetic pole portions spaced from the central axis of the iron core by a second radius, and with a difference between the second radius and the first radius being greater than a maximum width of each of the plurality of permanent magnets in the radial direction of the shaft, with the radial inner edge of the guiding surface spaced from the central axis of the at least one abutting member by a fourth radius, and with a sum of the fourth radius and the maximum width being smaller than the second radius.

17. The rotor for an inner-rotor type motor as claimed in claim 1, with each of the plurality of receiving grooves having a height in the axial direction of the shaft, and with the height being smaller than a maximum height of each of the plurality of permanent magnets in the axial direction.

18. The rotor for an inner-rotor type motor as claimed in claim 1, further comprising a fixing member mounted around the outer periphery of the shaft by tight coupling, with the fixing member abutting against a side of the radial extension portion of the at least one abutting member distant to the magnetic yoke portion.

19. The rotor for an inner-rotor type motor as claimed in claim 1, with the at least one abutting member including two abutting members respectively disposed on two sides of the magnetic yoke portion.

20. The A rotor for an inner-rotor type motor, comprising:
a shaft;
an iron core including a magnetic yoke portion and a plurality of magnetic pole portions, with the magnetic yoke portion including an assembly hole in a central portion thereof, with the shaft extending through the assembly hole, with the plurality of magnetic pole portions arranged around an outer periphery of the magnetic yoke portion, with the iron core including a plurality of receiving grooves, and with each of the plurality of receiving grooves formed between two adjacent magnetic pole portions;
a plurality of permanent magnets received in the plurality of receiving grooves, respectively; and
at least one abutting member coupled with an outer periphery of the shaft, with the at least one abutting member including a radial extension portion having a guiding surface, and with the guiding surface facing and abutting against at least one of the plurality of permanent magnets, with the at least one abutting member including two abutting members respectively disposed on two sides of the magnetic yoke portion, with each of the two abutting members including an extension tube at a central portion of the radial extension portion thereof, with the extension tubes of the two abutting members respectively extending from the two sides of the magnetic yoke portion into the assembly hole, with the extension tubes of the two abutting members respectively having a first coupling portion and a second coupling portion, and with the two abutting members coupled with each other by the first and second coupling portions.

21. An inner-rotor type motor comprising:
a rotor comprising:
a shaft;
an iron core including a magnetic yoke portion and a plurality of magnetic pole portions, with the magnetic yoke portion including an assembly hole in a central portion thereof, with the shaft extending through the assembly hole, with the plurality of magnetic pole portions arranged around an outer periphery of the magnetic yoke portion, with the iron core including a plurality of receiving grooves, and with each of the plurality of receiving grooves formed between two adjacent magnetic pole portions;
a plurality of permanent magnets received in the plurality of receiving grooves, respectively; and
at least one abutting member coupled with an outer periphery of the shaft, with the at least one abutting member including a radial extension portion having a guiding surface, and with the guiding surface facing and abutting against at least one of the plurality of permanent magnets; and
a stator extending annularly to form a compartment, with the iron core, the plurality of permanent magnets, and the at least one abutting member of the rotor received in compartment, and with the shaft of the rotor rotatably coupled to the stator,
wherein the guiding surface has a radial outer edge and a radial inner edge located between the radial outer edge and the magnetic yoke portion in a radial direction of the shaft, and
wherein the radial extension portion of the abutting member has a thickness gradually increasing from the radial outer edge to the radial inner edge.

* * * * *